United States Patent
Byrnes et al.

(12)

(10) Patent No.: US 6,318,527 B1
(45) Date of Patent: Nov. 20, 2001

(54) INERTIAL VIBRATION ISOLATOR SPRING FOR HELICOPTER

(75) Inventors: Francis E. Byrnes, White Plains, NY (US); David N. Schmaling, Southbury, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 09/454,922

(22) Filed: Dec. 3, 1999

(51) Int. Cl.$^7$ ........................................... F16F 7/10
(52) U.S. Cl. .................... 188/380; 188/378; 267/285
(58) Field of Search .................... 188/380, 379, 188/378; 267/160, 161, 162, 273, 285, 275; 74/573 R, 574; 416/124, 500

(56) References Cited

U.S. PATENT DOCUMENTS

| | | | |
|---|---|---|---|
| 3,317,166 | * 5/1967 | Janssen | 267/158 |
| 4,145,936 | 3/1979 | Vincent et al. | 74/574 |
| 4,225,287 | 9/1980 | Vincent et al. | 416/145 |
| 4,323,332 | 4/1982 | Fradenburgh . | |
| 4,619,349 | * 10/1986 | Braun | 188/380 |
| 4,645,423 | 2/1987 | Ferris et al. . | |
| 4,779,483 | * 10/1988 | Andra et al. | 74/574 |
| 4,874,292 | 10/1989 | Matuska et al. . | |
| 5,901,616 | 5/1999 | Miner et al. | 74/574 |
| 5,954,480 | * 9/1999 | Schmaling et al. | 416/145 |

* cited by examiner

*Primary Examiner*—Robert J. Oberleitner
*Assistant Examiner*—Thomas J. Williams

(57) ABSTRACT

A novel apparatus and method are provided to reduce the interlaminar shear loading in the retention area of composite springs used in a vibration isolator for use with a helicopter main rotor. The composite springs, which are made of a graphite laminate, are weakest when subject to interlaminate shear. The shear forces are highest during bending and twisting about the longitudinal axis of the laminate composite. The invention consists of several techniques to minimize the inter-laminate shear. The first is the use of nylon mounting pads which are attached to the ends of the graphite laminate spring arm at the locations where mounting to the inner and outer hubs is to take place. In particular, it has been found that the nylon spacer must be recessed back from the perimeter edges of the graphite spring arm the same distance which is approximately equal to the width of the graphite spring arm. Next the location of the bolt holes in the spring arm must be critically located so as to avoid that portion of the spring arm which has the highest shear loading.

6 Claims, 10 Drawing Sheets

INERTIAL VIBRATION ISOLATOR SPRING FOR HELICOPTER

TECHNICAL FIELD

This invention is directed to vibration isolator springs in a vibration isolator assembly, and more particularly, to an improved apparatus and method of mounting said springs in said assembly for use with a helicopter main rotor system.

BACKGROUND OF THE INVENTION

Mast-mounted vibration isolators are well-known in the art for canceling or substantially reducing vibratory forces active on a helicopter rotor. While most such devices are referred to as "vibration absorbers", this may be viewed as a misnomer inasmuch as these devices typically isolate the energy produced by cyclic in-plane and out-of-plane loads rather than absorb the energy as the name implies. Such devices typically comprise: a hub attachment fitting for mounting to the main rotor hub such that the isolator is rotated in a plane parallel to the main rotor disc, and a spring-mass system mounted to and rotating with the hub member. The troublesome in-plane forces comprise (n−1) frequency vibrations and (n+1) frequency vibrations. By (n−1) vibrations we mean the vibrations which oscillate at a frequency equal to the number of blades (n) minus 1 times rotor rpm, i.e. (n−1) * rotor rpm, and by (n+1) vibrations we mean the vibrations which oscillate at a frequency equal to the number of blades (n) plus 1 times rotor rpm, i.e. (n+1) * rotor rpm. Taking a four-bladed rotor as an example, these vibrations are also sometimes referred to as 3P and 5P vibrations. The spring arm-mass system is tuned in the non-rotating condition to a frequency equal to n * rotor rpm (e.g., 4P for a four-bladed rotor) at normal operating speed, so that in the rotating condition it will respond to both N+1 and N−1 frequency vibrations (i.e., 3P and 5P).

FIGS. 1a, 1b and 1c, depict a prior art vibration isolator similar to that described and illustrated in U.S. Pat. No. 5,901,616 to Miner et al. (hereafter 'Miner' and assigned to the assignee of the present invention) which is hereby incorporated by reference. As shown a vibration isolator 100 comprising a circular inertial mass 102 is supported from an inner hub 104 by resilient spring arms 106 so as to be capable of oscillation in any direction within its plane of rotation. The isolator 100 of FIG. 1a is mounted to the rotor mast 108 of FIG. 1b to render the configuration of isolator/mast 110 of FIG. 1c. This prior art isolator 100 is capable of canceling both (n−1) and (n+1) frequency vibrations of a helicopter rotor in a single installation. As shown in FIG. 1a the spiral shaped spring arms 106 are fastened to both the inner hub 104 and the circular inertial mass 102 with bolts at each of the spring arm ends 112 and 114. These spring arms 106 are typically made from graphite composites consisting of multiple parallel layers of graphite held together by epoxy as is well known in the art.

The root end retention of these composite spring arms 106 which are incorporated in main rotor helicopter vibration isolators are most highly loaded and structurally the most critical in the isolator design. The operation of the isolator creates a high concentrated bending moment that must be reacted at the retention areas 116 and 118 by a bolted connection consisting of a metal hub (inner metal hub 120 and outer metal hub 122) and respective metal retention plates 124, 126 (FIG. 1a). This retention configuration creates a very abrupt load transfer from the composite spring arm 106 to the bolted metal retention at both inner and outer retention areas 116, 118. A severe prying of the spring arm under the bending load generates very high transverse shears and corresponding interlaminar shear stresses which are the most critical loading for a composite isolator spring arm.

Previous main rotor isolator designs, such as Miner and Vincent et al. (U.S. Pat. Nos. 4,145,936 and 4,225,287) relied upon a bolted rigid spring-to-hub connection. This type of design configuration generates a very sudden load transfer of the isolator spring arm bending moment into the rigid metal retention, creating very high interlaminar shear stresses in the composite spring arm. Since a given composite material selected for the spring arm design has a specific interlaminar shear stress strength, a higher spring arm stress must be reduced by either thickening or widening the spring arm geometry which compromises the design to other than optimum.

While the teachings disclosed in the Miner and the Vincent patents provide a baseline for design and development of the vibration isolator described therein, they do not address the issue of reducing interlaminar shear stress at the root retention area of the spiral shaped springs.

Without reduction of this shear load, the springs must be over built throughout to compensate for this factor, increasing cost and weight; both important factors in helicopter design.

A need, therefore, exists for an apparatus and method of attaching spring arm ends to the inner and outer hubs of a vibration isolator which reduces interlaminar shear loads, and, inter alia, facilitates optimum design requirements for a composite spring arm, provides improved structural efficiency, reduces fabrication costs, and reduces the weight of a helicopter.

SUMMARY OF THE INVENTION

The above discussed and other drawbacks and deficiencies of the prior art are overcome or alleviated by the present invention.

A novel apparatus and method are provided to reduce the interlaminar shear loading in the retention area of composite springs used in a vibration isolator for use with a helicopter main rotor. Uniquely configured nylon pads are attached to the spring arm retention area to provide a stress dissipation area between the composite spring arm and the metal retention components. This allows optimization of the isolator spring arm design. The thickness of the nylon pads and the planform geometry are calculated based on the isolator stiffness, frequency and composite material generic properties to create the highest strength composite spring arm for a given stiffness, and frequency design requirements. In addition the uniquely configured pads allow a simple constant width and thickness isolator spring arm design. The location of bolt through-holes in the retention area is also calculated to avoid piercing high concentrations of interlaminar stress loading.

The above-discussed and other features and advantages of the present invention will be appreciated and understood by those skilled in the art from the following detailed description and drawings.

BRIEF DESCRIPTION OF THE DRAWINGS

A more complete understanding of the present invention and the attendant features and advantages thereof may be had by reference to the following detailed description of the invention when considered in conjunction with the following drawings wherein.

DETAILED DESCRIPTION OF THE INVENTION

Figure 1A:
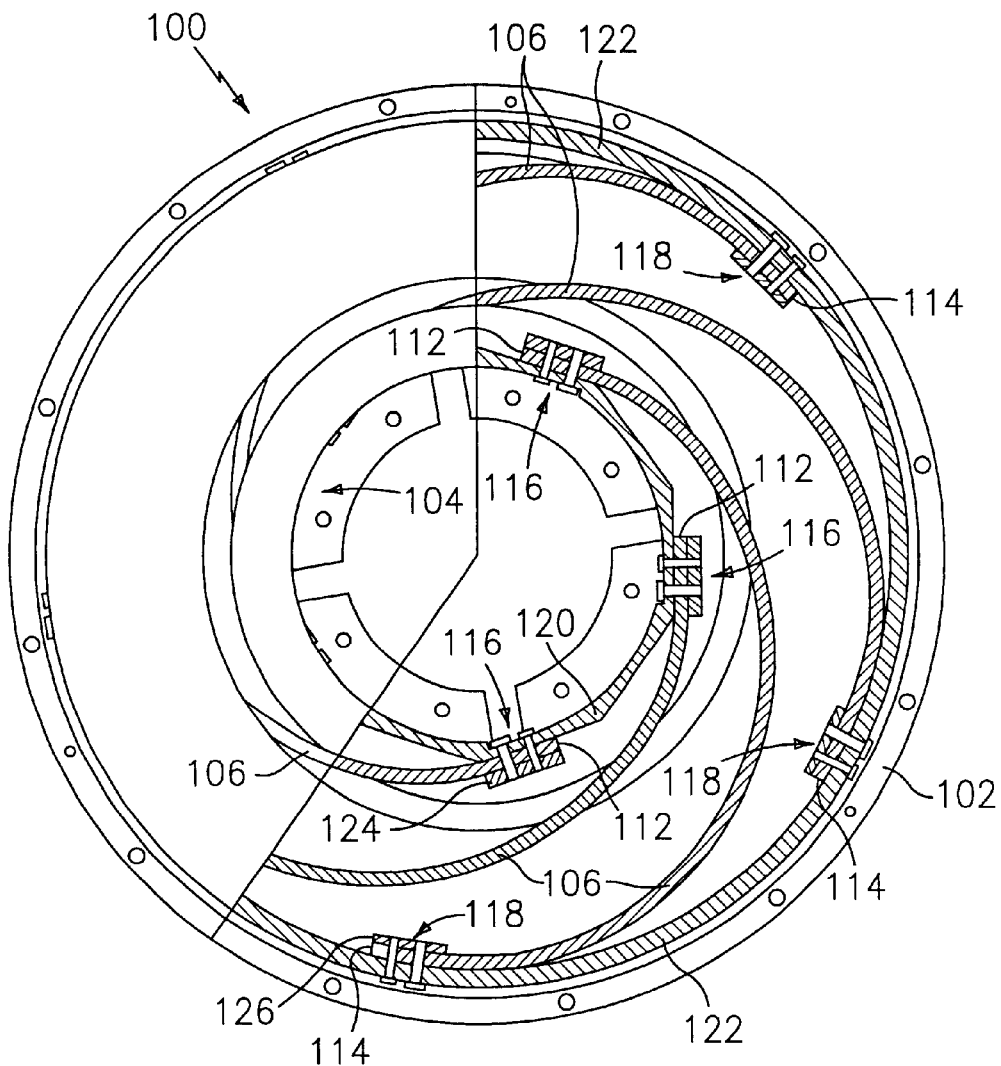
FIG. 1a is a top down view of a prior art vibration isolator assembly with a cutaway view illustrating spiral shaped spring arms.
Figure 1B:
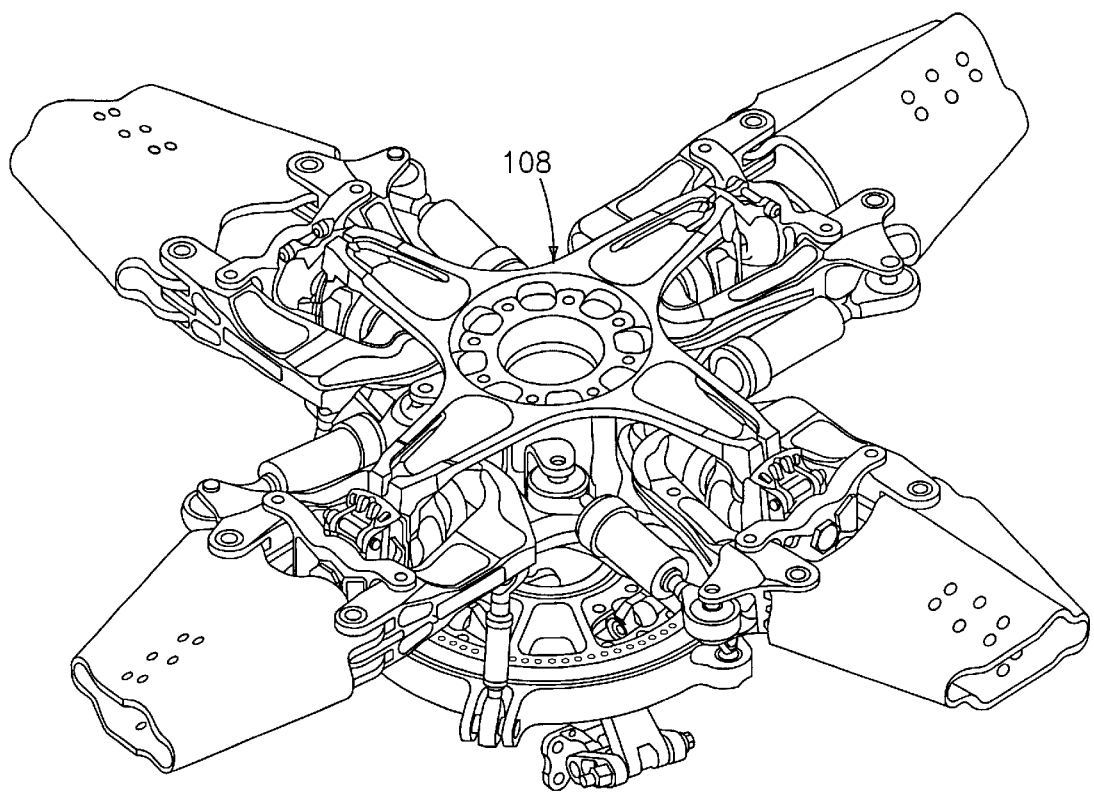
FIG. 1b is a perspective view of a prior art helicopter main rotor assembly illustrating a mounting surface for the prior art vibration isolator assembly.
Figure 1C:
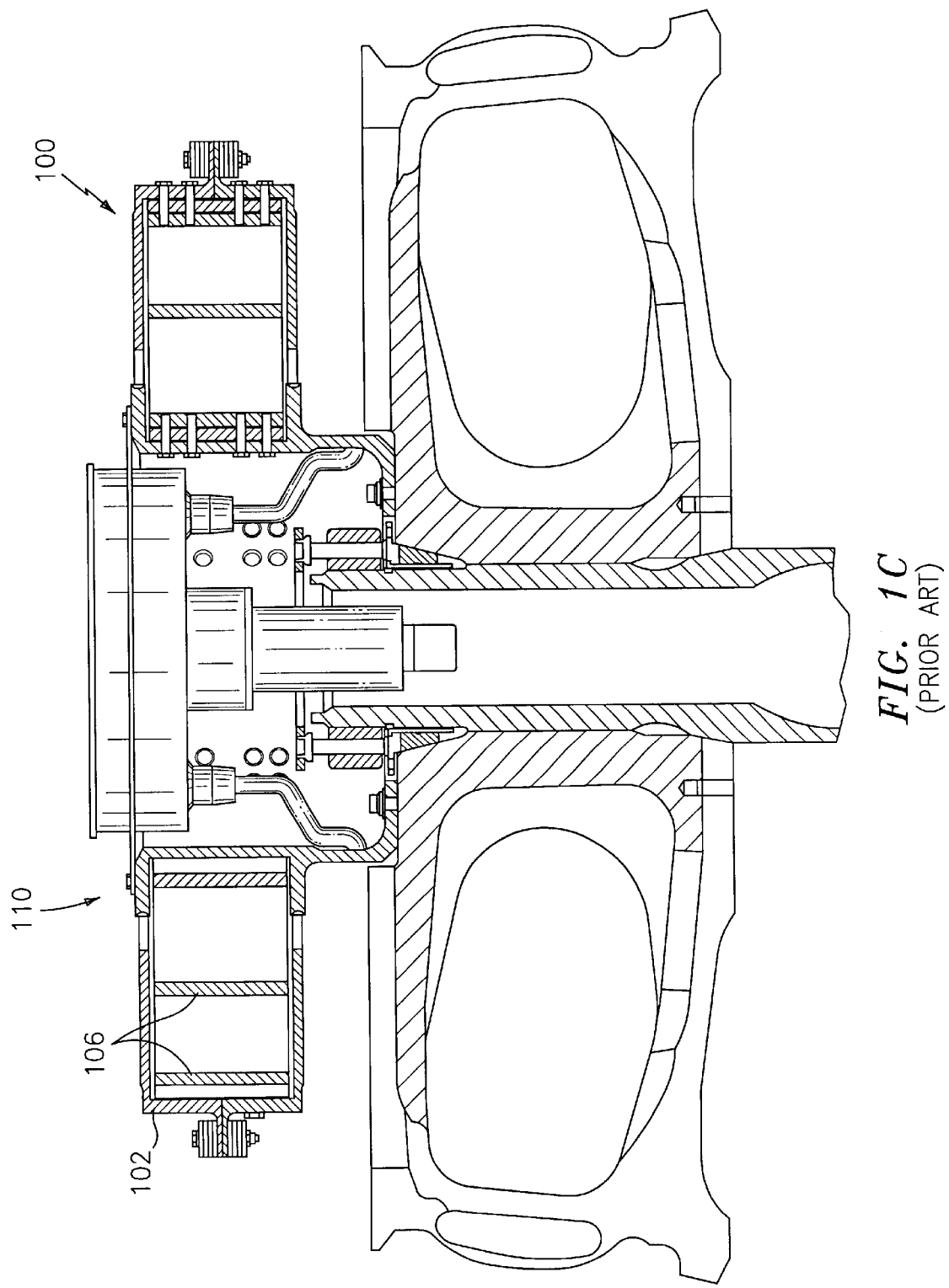
FIG. 1c is an elevation view of the prior art vibration isolator assembly mounted on the prior art helicopter main rotor assembly with a cutaway illustrating the internal components.
Figure 2:
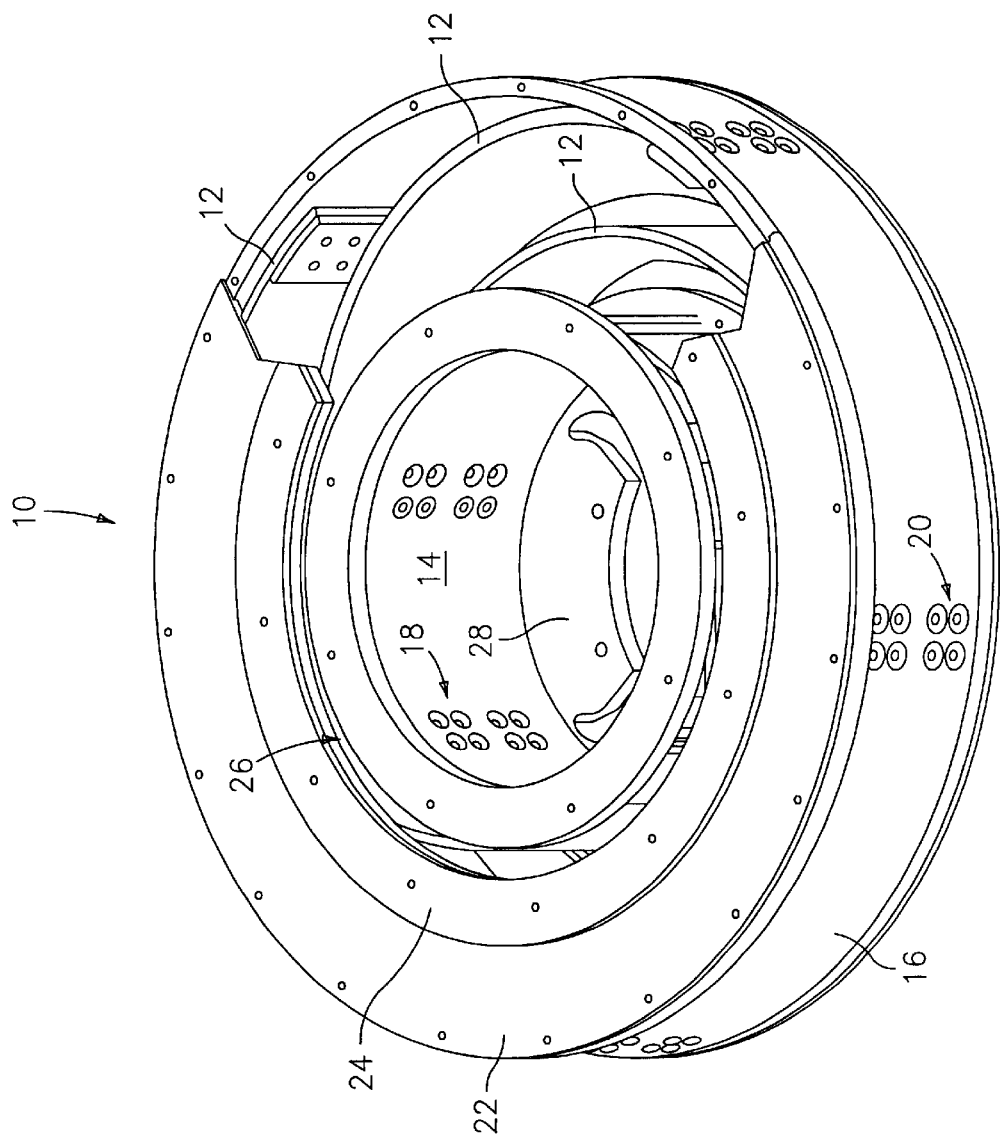
FIG. 2 is a perspective view of a vibration isolator assembly with a cutaway illustrating a spiral shaped spring arm.
Figure 3A:
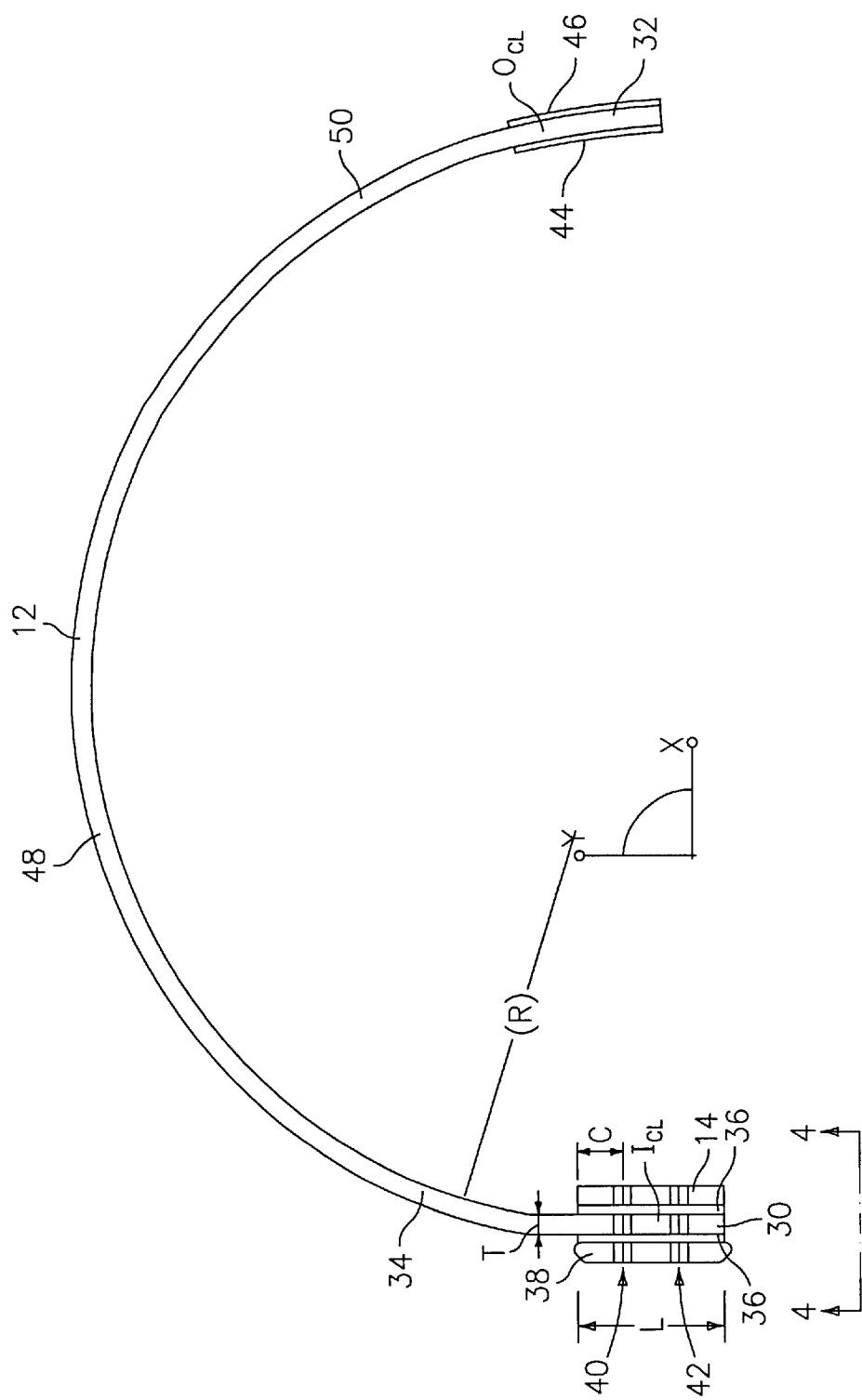
FIG. 3a is a top down view of the isolator spring arm and attachment areas for an inner hub and an outer hub.

Referring to FIG. 2, a perspective view of a vibration isolator assembly 10 with a cutaway illustrating the spiral shaped spring arms 12 in accordance with an exemplary embodiment of the invention is generally shown. Spiral shaped spring arms 12 are mounted between an inner hub 14 and an outer hub 16. The inner hub 14 has five groups of mounting holes 18 spaced equiangularly (every 72°). Similarly, the outer hub 16 has five groups of mounting holes 20 also spaced equiangularly about the hub 16. The inertial mass of the vibration isolator is essentially carried in the structure of the outer hub 16. A pair of annular covers 22 are mounted on the top and bottom (not shown) of the outer hub 16 and have a ring stiffener 24 terminating the cover's smaller radius. A gap 26 is provided between the ring stiffener 24 and the inner hub 14 to allow for relative movement between the inner and outer hubs 14, 16 as the vibration isolator assembly reacts to vibrations from the main rotor (not shown). Further, the inner hub 14 has a mounting collar 28 which is bolted to the top of a helicopter rotor assembly similar to the previously described prior art of Miner et al. (see FIGS. 1a, 1b and 1c) to facilitate securing the vibration isolator assembly 10 to the rotor assembly. Referring to FIG. 3a, a top down view of one of the spiral shaped spring arms 12 is illustrated having a first retention end 30 for inner hub mounting and a second retention end 32 for outer hub mounting. The section of inner hub 14 shown in FIG. 3a is not a complete top down view of the entire inner hub 14, but merely that portion of the inner hub 14 immediately adjacent to the clamping area so as to facilitate a discussion of the spring arm mounting. For a more complete description of the inner and outer hub assembly reference is made to the previously described U.S. Pat. No. 5,901,616, Miner et al., as it is similar thereto.

Retention end 30 of the spiral shaped spring arm 12 is actually a planar section of approximately three inches in length which extends from the free end of the spring arm 12 up to a first radius of curvature 34 at a meeting line T. The inner clamping area $I_{CL}$ is that portion of the retention end 30 as indicated by the dimension L. On either side of the inner clamping area $I_{CL}$, there are mounted two identical nylon pads 36, whose thickness and dimensions will be calculated in detail below. The nylon pads 36 buffer the mechanical loads exerted on the first retention end 30 by the inner hub 14 and a spacer block 38. Each of the aforementioned components 14, 30, 36, and 38 has a series of through-holes 40 and 42, as shown in FIG. 3a which are aligned to receive a series of bolts (not shown) for fixing end 30 to the inner hub 14. The bolt hole 40 which is closest to the main body of the spring arm is set back a distance C from the chord-wise edge of the inner clamping area $I_{CL}$ which is the edge of the clamping area closest to the spring arm body. As will be seen below, the setback C of the through-hole 40 minimizes the amount of structural weakening due to through-hole penetration in a highly loaded area of the spring arm 12.

The second retention end 32 of the spring arm 12 is also sandwiched between two unique nylon pads 44 and 46. This end 32 of the spring arm 12 is of a generally constant curvature designed to mate with the curved inner surface of the outer hub 16. Therefore, due to the thickness of the spring arm 12, the nylon pads 44 and 46 are dimensioned to match the differing curvatures of the spring arm 12 due to differing radii of curvature. The through-holes (not shown) located in the second retention end 32 of the spring arm 12, are also recessed away from the chord-wise edge of the outer hub clamping area $O_{CL}$ by the dimension C so as to minimize penetrating an area of high stress loading. The remainder of the spring arm 12 is made up of a series of varying arcs of different sized radii. In this exemplary embodiment of the present invention a first radius of curvature 34 extending from the first retention end 30 has a radius of curvature of 7.9", whereas a second radius of curvature 48 has a radius of curvature of 11.74"and a third radius of curvature 50 has a radius arc of 10.49". These varying radii of curvature 34, 48, 50 give the spring arm 12 its spiral shape. The exact dimensions of the nylon pads 36, 44 and 46 and the location of the first through-hole 40 will be derived and calculated in detail below.

Figure 3B:
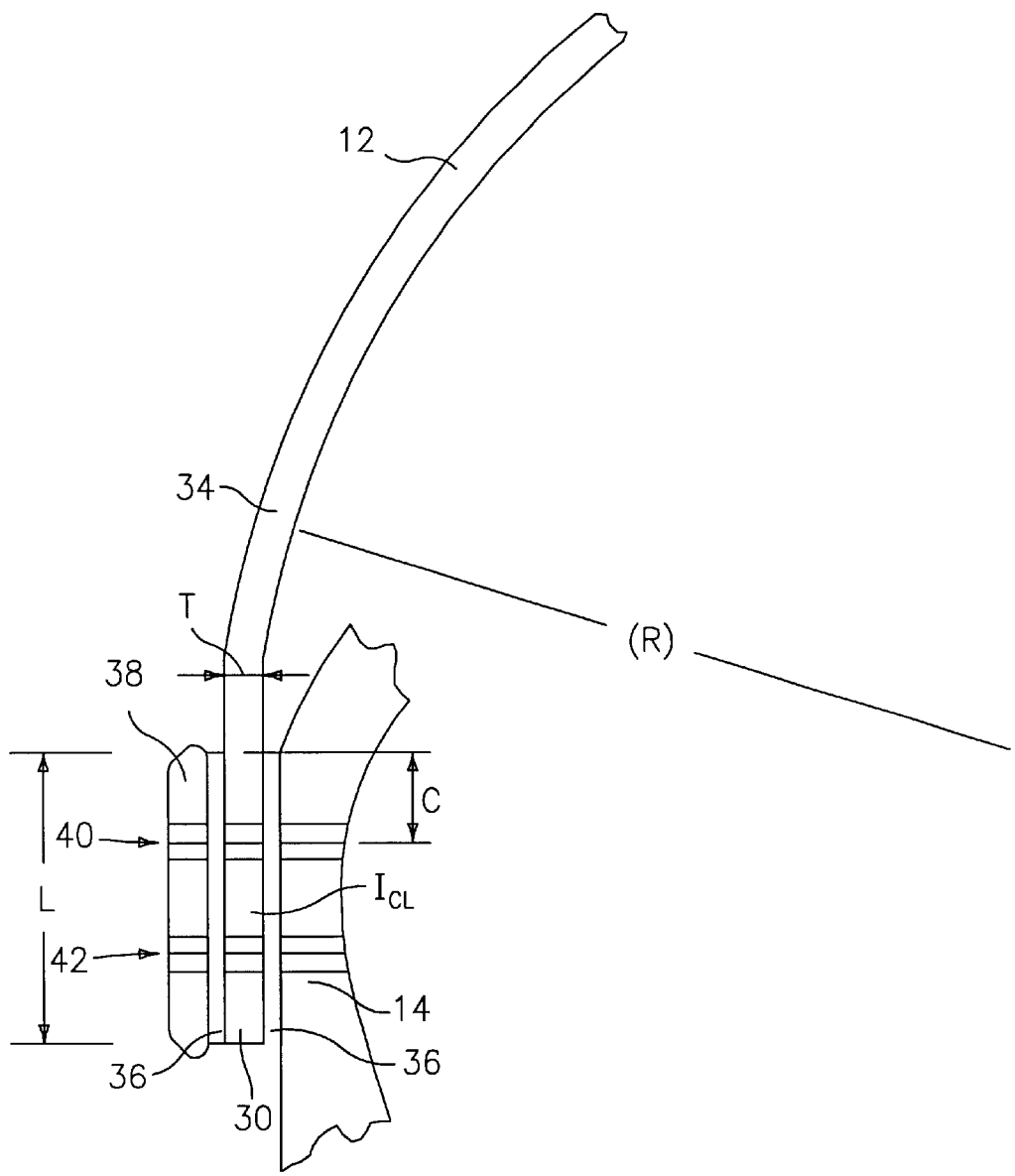
FIG. 3b is an enlargement view of a portion of FIG. 3a illustrating the inner hub and spring arm attachment area.

Referring to FIG. 3b, an enlarged and slightly modified view of a portion of FIG. 3a illustrating the inner hub/spring arm attachment area is shown. The outer perimeter of the inner hub 14 is a ten-sided surface such as illustrated in the prior art (see FIG. 1a) where each one of the five spiral spring arms 12 is mounted to an alternating inner hub surface thus distributing the spiral arms equally about the hub center. The inner hub 14 is shown in a sectional view detailing one of the ten flat outer surfaces to which a spring arm 12 is mounted and also illustrating the inner constant-radius curved surface onto which the mounting bolt holes 40, 42 terminate. Thus it can be observed that in FIG. 3a, only a small portion of the inner hub 14 is shown to illustrate the manner in which the spring arm 12 attaches to the inner hub 14. The dimension L indicates the length of the inner hub clamping area $I_{CL}$ on the spring arm 12 and the dimension C indicates the length of the set back distance for the first bolt hose 40 as measured from the chord-wise edge of the clamping area $I_{CL}$ so as to minimize interlaminar stress loads in the clamping area $I_{CL}$.

Figure 3C:
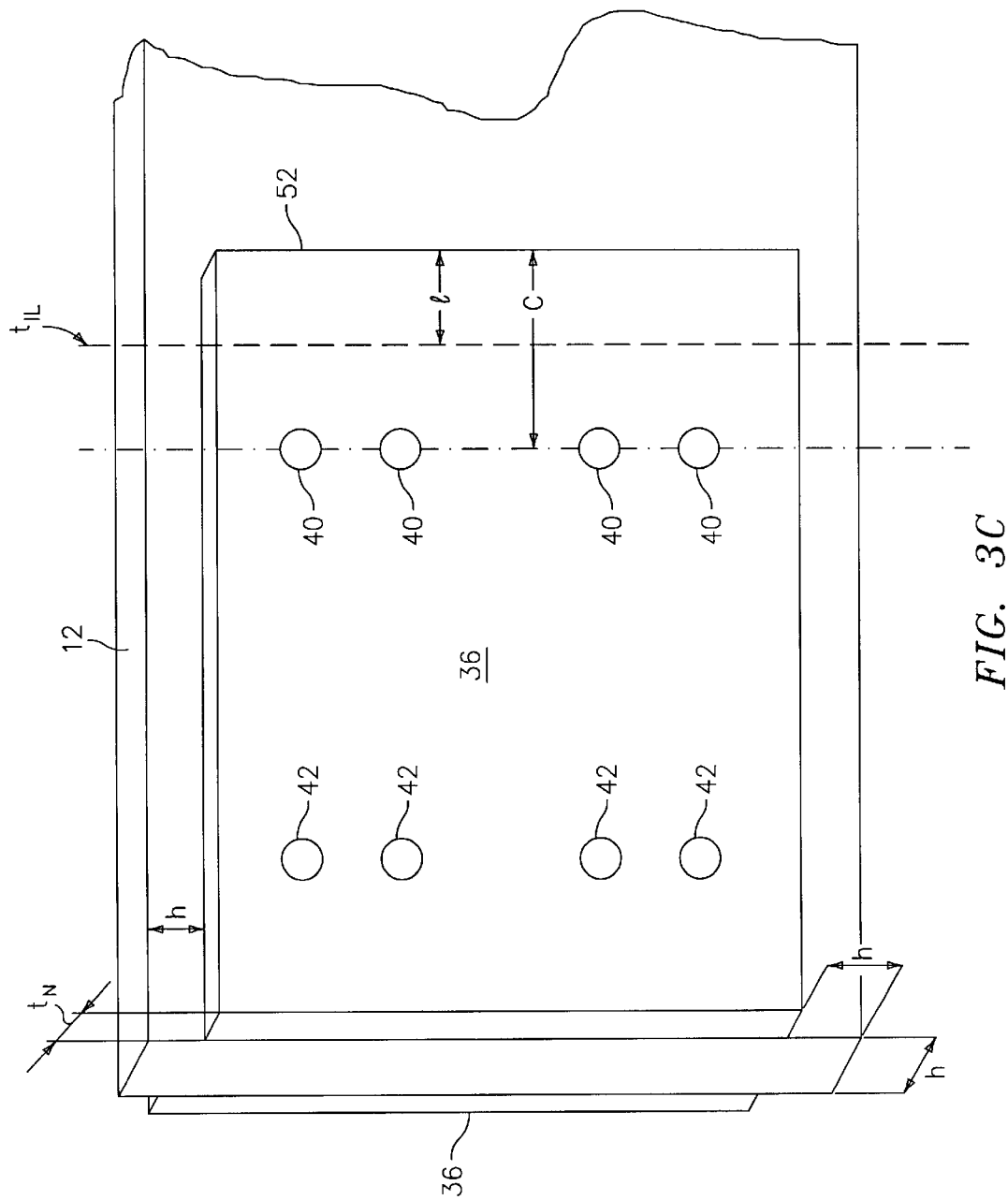
FIG. 3c is a perspective view of an end of the isolator spring arm illustrating a clamping and attachment areas.

Referring to FIG. 3c, a perspective view of an inner hub end of isolator spring arm 12 illustrating the clamping and attachment areas is shown. Both sides of the terminal end of the spring arm 12 have nylon pads 36 attached to them. The plurality of through-holes 40 and 42 each maintain a continuous aperture from one nylon pad 36 to the other nylon pad 36. Each nylon pad 36 has a uniform thickness $t_N$ and is arranged so that the top and bottom edge of the nylon pad 36 is recessed a distance h from the respective top and bottom edge of the spring arm 12. As described below in greater detail, the maximum interlaminar shear stress of the spring arm 12 occurs a distance l from the interior chord wise edge 52 of the nylon pad 36 along the line labeled $t_{IL}$. The through-holes 40 are located at a greater distance C from the interior chord wise edge 52 to avoid this area of high stress.

Figure 4:
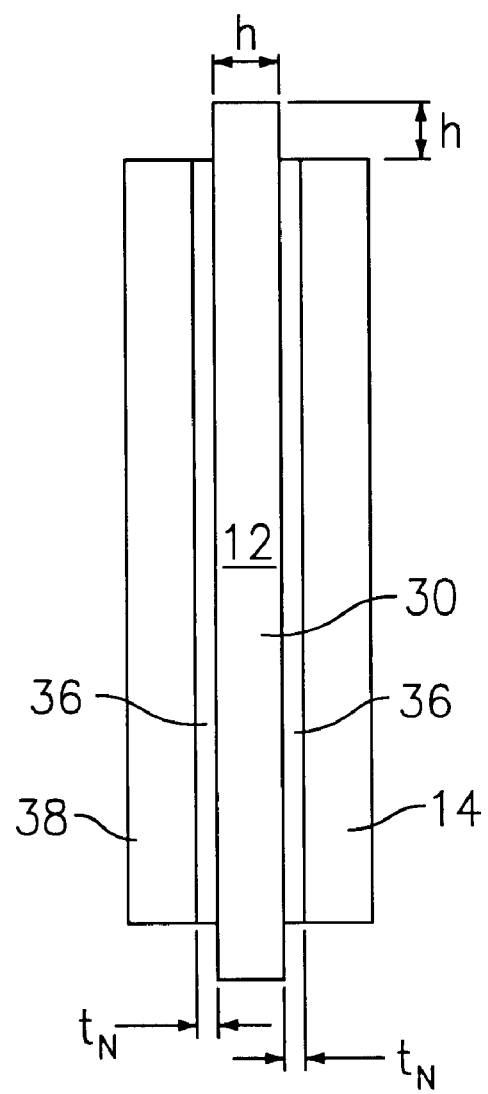
FIG. 4 is an elevation end view taken of FIG. 3a at 4—4.

Referring to FIG. 4, an elevation end view illustrating the first end 30 of the spring arm 12, a portion of the inner hub 14, two nylon pads 36, and a spacer block 38 is shown. The first end 30 of the spring arm 12 is attached to the inner hub 14 with bolts (not shown). According to the design equations given below, spring arm 12 having a thickness h, can be supplemented with a pair of nylon pads 36, to reduce the shear stress experienced by the spring arm 12 which is preferably comprised of a graphite composite. The two nylon pads 36 each of a thickness $t_N$, are mounted on opposing sides of the first end 30 of the spring arm 12. The nylon pads 36 are further dimensioned so their perimeter edge is setback from the top and bottom edge of the spring arm 12 by a distance h as shown in FIG. 4. The spacer 38 is dimensioned to have the same surface area as the nylon pad 36. Thus when the bolts are tightened, securing the spring arm 12 in place, all reactive forces are transmitted between the spring arm 12 and the inner hub 14, through the pair of surfaces defined by the area of the nylon pads 36.

As for the second end 32 of the spring arm 12, two similarly dimensioned nylon pads 44 and 46 (FIG. 3a) are applied to the second retention end 32 with the following exception. The second end 32 of the spring arm 12 mounts on the inner perimeter curved surface of the outer hub 16, and therefore the spring arm 12 has a different radius of curvature on it's inner and outer surfaces which are separated by the thickness h. The nylon pads are still manufactured with a thickness $t_N$, and dimensioned to be recessed from the top and bottom edge of the spring arm 12 by the distance h, however, they each have a different radius of curvature to match their respective surface of the spring arm 12 to which they are mounted to.

Figure 5:
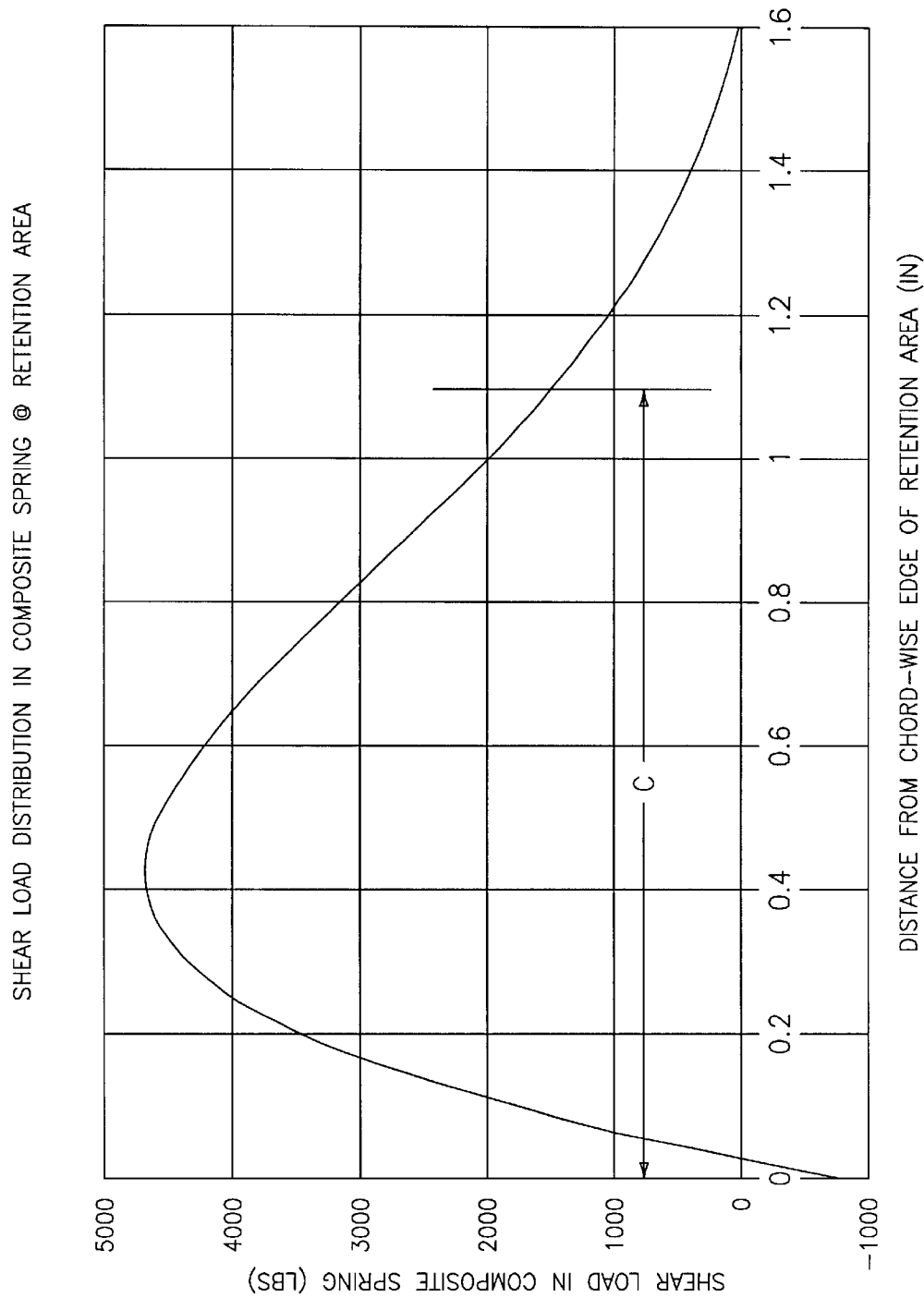
FIG. 5 is a graph of a shear load distribution in the composite ring arm retention area.

Referring to FIG. 5 a graph illustrating the shear load distribution in the composite spring arm retention area is shown. As derived from the equations set forth in detail below, the shear load distribution is a function of the distance from the chord-wise edge of the mounting area of the spring arm 12, regardless of which end of the spring arm 12 is being analyzed. Therefore, to minimize the weakening impact that through-holes have in the composite structure, the holes are located a distance C from the chord-wise edge 52 of the mounting area as shown in the FIG. 3a.

Figure 6:
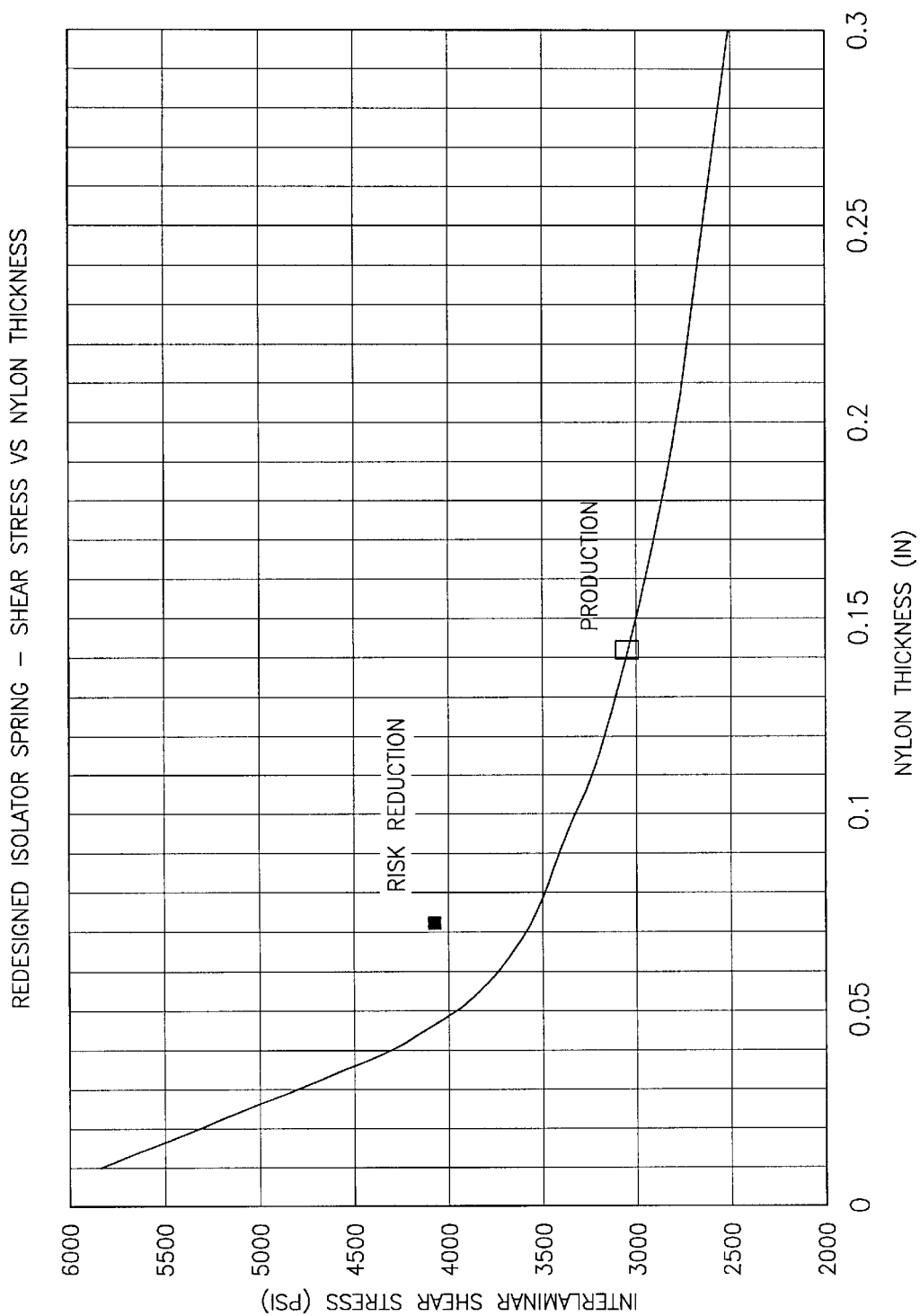
FIG. 6 is a graph of an inter-laminar shear stress in the isolator spring arm verses nylon thickness.

Referring to FIG. 6 a graph illustrates the inter-laminar shear stress in the isolator spring arm 12 in the spring arm retention ends 30, 32 versus the thickness of the nylon pads. As the thickness of the nylon pads $t_N$, increases (x-axis), the inter-laminar shear stress is reduced (y-axis). In the present example the nylon pads have a thickness of 0.140 in. The method of determining the appropriate dimensions of the nylon pads 36, 44, and 46, as well as the setback distance C of the bolt through-holes 40, 42 is derived in the method moment transfer design set forth below.

For a given isolator frequency and stiffness requirements, using traditional curved beam design equations, an optimum open section spring arm configuration can be designed to determine the spring arm radius, width, thickness and composite material laminate definition. All the design constraints are satisfied except the critical spring arm moment transfer from the composite spring arm into the spring arm retention area. To optimize this aspect of the spring arm design a unique series of design steps are executed to create a retention configuration of the composite spring arm, metal hub, metal retention plates, and nylon pads that are situated between the hub and plates and the retention bolts.

For a given isolator design requirements:

$$K = \frac{E}{0.3} \times \frac{bh^3}{12R^3} \quad (1)$$

where
K=stiffness requirement (lbs/in.)
E=composite spring arm modulus (psi)
b=spring arm width (in.)
h=spring arm thickness (in.)
R=spring arm radius (in.).
The open section strain due to inplane design motion is:

$$\varepsilon = \frac{\alpha h}{0.3\pi R^2} \quad (2)$$

where
$\epsilon$ is the composite spring arm strain ($\mu$in./in.), and
$\alpha$ is the spring arm design displacement (in.).
Once the composite spring arm is optimized using the traditional design equations 1 and 2, the spring arm retention area must be optimized in the following unique procedure.

I. Using design equations 1 and 2, the design moment at the retention area is determined:

$$M = \frac{bh^3 E\alpha}{1.8\pi R^2} \quad (3)$$

II. For a wide beam that is optimum for an isolator spring arm, the critical interlaminar shear stress in the spring arm at the retention area can be shown to occur at a distance of l=h+$t_N$ from the edge of the retention area as measured from the chord-wise edge 52 of the clamping area. In addition the peak shear stress $\tau_{IL}$ can be determined at this location to be:

$$\tau_{IL} = e^{-\beta l} 2\beta M \sin \beta l \quad (4)$$

where $\beta$ is defined as $$\beta = \left(\frac{2E_N 12}{4t_N bh^3 E}\right)^{1/4} \quad (5)$$

and where $E_N$ is the nylon modulus (psi) and E is the spring arm modulus (psi). In equation 4, $\tau_{IL}$ can be set equal to the allowable shear stress of the material and a uniquely determined nylon thickness is determined to optimize the design (as shown in FIG. 6).

In addition from equation 4, a location for the first set of bolts may be uniquely established to maintain the optimization of the design as shown in FIG. 5 where C is an optimized location of the first bolts.

Furthermore for wide beams subject to transverse shear loading the corresponding interlaminar shear stress is not constant across the width of the composite beam (See, Impact of Modern Fiber Composite Materials on Dynamically Loaded Structures, K Pfeifer, O. Haider, *Vertica,* Vol 13, No.2, pp 175–185, 1989, which is hereby incorporated by reference). The interlaminar shear stress nominally equal to $$\frac{3V}{2bh}$$

peaks up at the edges of the spring arm to a value of 1.5 to 2.0 the nominal beam theory value, where V is the interlaminar shear load (lbs). Since this peaking occurs within one thickness distance h from the edge of the spring arm width, a further optimization is incorporated by keeping the nylon pad width, one beam thickness from the edge of the spring arm (h) as shown in FIGS. 3*c* and 4. This ensures that a transverse shear load is not present in the spring arm at the edges which would cause an increase in the normal beam theory interlaminar shear stress of $$\frac{3V}{2bh}.$$

Thus using the above calculations, the nylon pads are fabricated with a thickness $t_N$ and attached to the spring arm ends so as to have the desired recessed distance (h) from the spring arm edge. The bolt holes are then fabricated at the desired location with the appropriate setback from the chord-wise edge 52 adjacent to the spring arm body. Thus a method and apparatus is disclosed which reduces interlaminar stress at the mounting area, thus optimizing the curvilinear beam design without compensating for high stress points in the mounting areas.

While an embodiment of the invention has been particularly described and illustrated, it will be understood that various modifications can be made without departing from the spirit and scope of the appended claims. For example, the spring arm and mounting pads may be made from different materials or methods of construction; the spring arm spiral geometry may consist of various radii with or without planar sections; or the spring arms may comprise nonrectangular cross-sections.

What is claimed is:

1. A vibration isolator assembly adapted for rotation about an axis, said assembly comprising:

an inner hub adaptable for mounting on said axis;

an outer hub having a predetermined inertial mass; and a plurality of spiral shaped spring arms, each said arm having a body with a first retention portion connected to said inner hub and a second retention portion connected to said outer hub;

at least one pad disposed on at least one of said first retention portion or said second retention portion; and wherein each said spring arm includes said at least one pad disposed between said first retention portion and said inner hub and a second pad disposed between said second retention portion and said outer hub.

2. A vibration isolator assembly adapted for rotation about an axis, said assembly comprising:

an inner hub adaptable for mounting on said axis;

an outer hub having a predetermined inertial mass; and a plurality of spiral shaped spring arms, each said arm having a body with a first retention portion connected to said inner hub and a second retention portion connected to said outer hub;

at least one pad disposed on at least one of said first retention portion or said second retention portion;

each said first retention portion and said second retention portion include an essentially rectangular cross-section having a thickness h;

each said first retention portion and said second retention portion having at least one external surface;

said at least one pad being disposed on one of said at least one external surface of said first retention portion or of said second retention portion;

each of said at least one external surface being perpendicular to its respective said rectangular cross-section;

said at least one pad being recessed at least a distance h from a top edge and a bottom edge of said external surface; and said at least one pad is of a uniform thickness $t_N$ and where $t_N$ has a magnitude less than h.

3. A vibration isolator assembly adapted for rotation about an axis, said assembly comprising:

an inner hub adaptable for mounting on said axis;

an outer hub having a predetermined inertial mass; and a plurality of spiral shaped spring arms, each said arm having a body with a first retention portion connected to said inner hub and a second retention portion connected to said outer hub;

at least one pad disposed on at least one of said first retention portion or said second retention portion;

each said first retention portion and said second retention portion include an essentially rectangular cross-section having a thickness h;

each said first retention portion and said second retention portion having at least one external surface;

said at least one pad being disposed on one of said at least one external surface of said first retention portion or of said second retention portion;

each of said at least one external surface being perpendicular to its respective said rectangular cross-section;

said at least one pad being recessed at least a distance h from a top edge and a bottom edge of said external surface;

said retention portion has at least two said external surfaces;

each said external surface of each said retention portion having at least one of said at least one pad disposed on said each said external surface;

each said pad having an interior chord-wise edge, said edges being parallel and aligned in a span-wise manner;

at least one through-hole passing from one of said at least two said external surfaces to the other in each of said retention portions;

said at least one through-hole passing through each said pad disposed on its respective said external surface; and each of said at least one through-holes located at least a distance C from its respective said interior chord-wise edge;

wherein said distance C is greater than a distance l which is the location of the peak interlaminar shear load in said retention portions from said interior chord-wise edge.

4. A method for determining a retention configuration for a spring arm for use in a vibration isolator, said method comprising:

optimizing a composite spring arm from equations $$K = \frac{E}{0.3} \times \frac{bh^3}{12R^3}$$

and $$\varepsilon = \frac{\alpha h}{0.3\pi R^2};$$

and calculating the design moment at the retention area as $$M = \frac{bh^3 E\alpha}{1.8\pi R^2}.$$

5. A method as in claim 4 and further comprising:

setting the peak shear stress $t_{IL}$ equal to the allowable shear stress of said spring arm material; and uniquely determining a pad thickness $t_N$ from the equation $$\tau_{IL} = e^{-\beta l/2} \beta M \sin \beta l$$

where $\beta$ is defined as $$\beta = \left(\frac{2E_N 12}{4t_N bh^3 E}\right)^{1/4}.$$

6. A method as in claim 4 and further comprising:

determining l as the location of peak interlamina;

selecting C to be a distance greater than l; and locating through-holes in said retention area at a location C from said chord wise edge.

* * * * *